United States Patent [19]
Nohmi et al.

[11] Patent Number: 4,737,957
[45] Date of Patent: Apr. 12, 1988

[54] METHOD OF PROCESSING ABNORMAL SITUATION IN DIGITAL TRANSMISSION SYSTEM

[75] Inventors: Makoto Nohmi, Kawasaki; Kinji Mori, Yokohama; Shoji Miyamoto, Kawasaki, all of Japan

[73] Assignee: Hitachi, Ltd., Toyko, Japan

[21] Appl. No.: 834,820

[22] Filed: Feb. 28, 1986

[30] Foreign Application Priority Data

Mar. 4, 1985 [JP] Japan .................................. 60-41323

[51] Int. Cl.⁴ ............................................. G06F 11/10
[52] U.S. Cl. ......................................... 371/49; 371/69
[58] Field of Search .............................. 371/49, 69, 22

[56] References Cited

U.S. PATENT DOCUMENTS

| | | | |
|---|---|---|---|
| 3,245,040 | 4/1966 | Burdett et al. | 371/49 |
| 3,772,649 | 11/1973 | Haselwood et al. | 371/69 |
| 4,093,825 | 6/1978 | Gladstone et al. | 371/69 |
| 4,245,212 | 1/1981 | Cirmele | 371/69 |
| 4,360,918 | 11/1982 | Ruhnau et al. | 371/69 |
| 4,558,379 | 12/1985 | Hutter et al. | 371/69 |

Primary Examiner—Charles E. Atkinson
Attorney, Agent, or Firm—Antonelli, Terry & Wands

[57] ABSTRACT

In a digital transmission system wherein a plurality of transmission control units each of which has received data error detecting means, data storing means, receiving means and transmitting means are successively connected by a transmission medium, the transmission control unit is operated in a through mode in which received data is directely forwarded under a normal state, and when an error has been detected in received data, the operation mode of the transmission control unit is switched to a store-and-forward mode in which a group of received data are first stored and are thereafter forwarded only in the case of the absence of an error. When normal data have been continuously received in a predetermined number of times in the operation in the store-and forward mode, the operation mode of the transmission control unit is switched to the through mode.

6 Claims, 4 Drawing Sheets

METHOD OF PROCESSING ABNORMAL SITUATION IN DIGITAL TRANSMISSION SYSTEM

BACKGROUND OF THE INVENTION

1. Field of the Invention

The present invention relates to a digital transmission system, and more particularly to a measure against faults in a digital transmission system extending via a plurality of transmission control units.

2. Description of the Prior Art

In order to cope with faults such as noise interference and disconnection in a digital transmission system, various mechanisms have heretofore been proposed and put into practical use. However, a large number of points to be improved are left in taking measures against faults in a high-speed digital transmission system in which data is relayed via a plurality of transmission control units. One prior effort described in Japanese Patent Application Laid-open No. 57-56060, with the intention of coping with a transient fault in a loop transmission system, circulates test data between two transmission control units and measures the frequency of occurrence of abnormal data so as to discriminate a cause of the fault and performs the report of the abnormal situation, the reconstruction of transmission paths, etc. as may be needed.

With this method, however, in a case where a plurality of transmission control units intervene, it is difficult to satisfactorily localize and find a faulty position. Moreover, when a large number of abnormalities have continuously occurred for such a reason that a single data block is apparently divided into a plurality of data blocks by the fault, the transmission control unit is very busy with the processing of the abnormalities, and the transmission of normal data might be adversely affected.

SUMMARY OF THE INVENTION

An object of the present invention is to provide a method of processing an abnormal situation in a digital transmission system which copes with an intermittent or continuous abnormality attributed to noise, disconnection etc. and can prevent the influence thereof.

Another object of the present invention is to facilitate the localization of an abnormal point in a digital transmission system, thereby to improve the reliability and maintenance of the transmission system.

In order to accomplish the object, the present invention consists, in a digital transmission system wherein a plurality of transmission control units each of which has received data error detecting means, data storing means, receiving means and transmitting means are successively connected by a transmission medium, in a method comprising the step of operating said transmission control unit in a through mode in which received data is directly forwarded under a normal state, the first switching step of switching the operation mode of said transmission control unit to a store-and-forward mode in which a group of received data is first stored and is thereafter forwarded subject to there being no error, in response to an error of received data detected in the operation in said through mode, and the second switching step of switching the operation mode of said transmission control unit to said through mode in response to the fact that normal data has been continuously received a predetermined number of times in the operation in said store-and-forward mode.

According to the present invention, transmission modes are switched stepwise depending upon the circumstances of the abnormal situations. More specifically, in the normal state, received data is directly forwarded as it is. When a data error has been detected, the transmission control unit is switched to a mode in which a received data frame is first stored and is thereafter forwarded only in the case of the absence of an error. In this mode, the propagation of the error data is prevented, and the position of a fault can be specified to lie in a section directly preceding the transmission control unit which has had an error detected again. When normal data has been continuously received a predetermined number of times, the transmission control unit is restored into the original state.

When, in the above mode, data errors have been further detected continuously, the storage and forwarding of data is prohibited until normal data is received. In this case, a step such as the reconstruction of transmission paths should preferably be taken.

The foregoing and other objects, advantages, manner of operation and novel feature of the present invention will be understood from the following detailed description when read in connection with the accompanying drawings.

DESCRIPTION OF THE PREFERRED EMBODIMENTS

While the present invention will now be described in conjunction with various embodiments of a wired loop transmission system, it is also applicable to wireless transmission and situations where no loop is formed.

Figure 1:
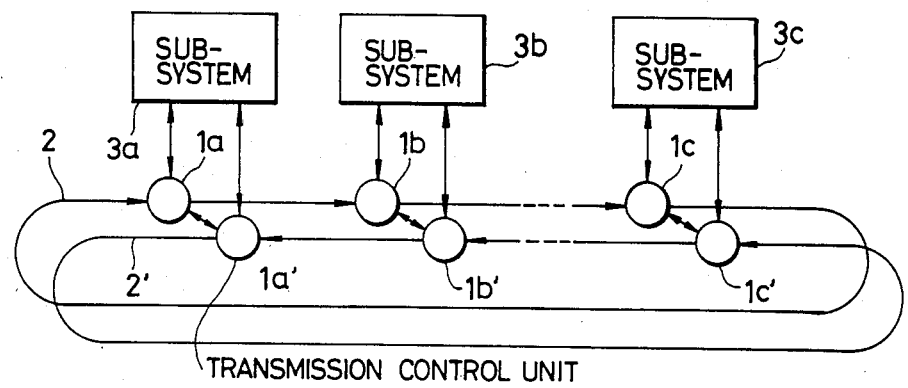
FIG. 1 is a block diagram showing an example of a transmission system to which the present invention is applied.

FIG. 1 shows an example of a loop transmission system to which the present invention is applied. Looped transmission lines 2 and 2' extend through a plurality of transmission control units 1 (1a, 1b, ..., 1n) and 1' (1a', 1b', ..., 1n'), and subsystems 3 (3a, 3b, ..., 3n) such as a computer and terminal devices which access the transmission lines 2 and 2' through the transmission control units 1 and 1'. The loop transmission system is provided with the two transmission lines whose transmitting directions are opposite to each other, and when a lasting fault has occurred, the transmission line is reconstructed by looping back at the transmission control units ahead of and behind the faulty spot. An example of such a transmission system is described in Japanese Patent Application Publication No. 58-47111.

Figure 2:
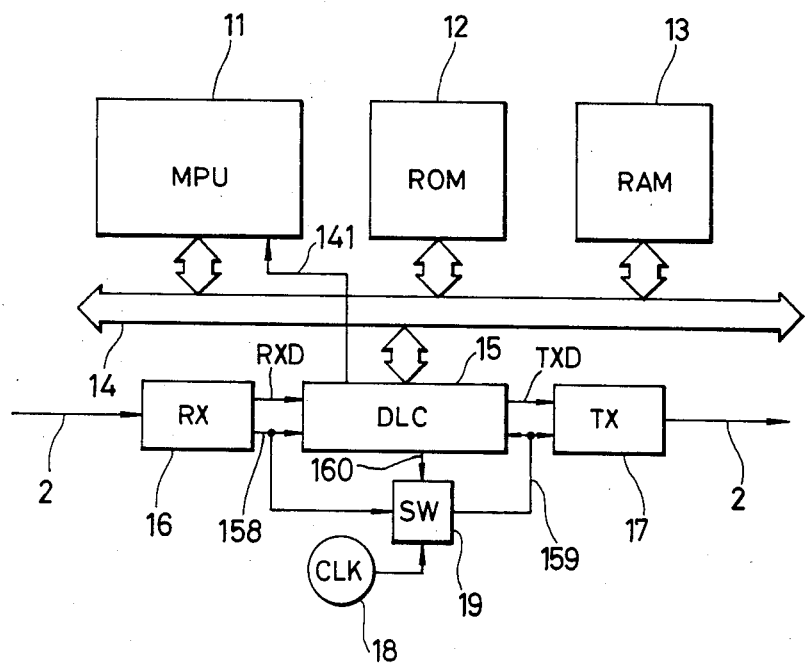
FIG. 2 is a block diagram of a transmission control unit in FIG. 1.

FIG. 2 shows the essential portions of the transmission control unit 1 which is suited to the present invention. A microprocessor for control (MPU) 11, a read-only memory for storing a program (ROM) 12, a random access memory for storing data (RAM) 13 and a data link circuit (DLC) 15 are interconnected by a bus 14 for addresses, data and control signals. A receiving interface portion (RX) 16 receives a signal sent over the transmission line 2, and it extracts received data RXD and a clock 158 and applies them to the DLC 15. A transmitting interface portion (TX) 17 delivers transmission data TXD from the DLC 15 to the transmission line 2 in synchronism with a clock signal for transmission 159 from a clock selector (SW) 19. The clock selector 19 selects either the clock signal 158 extracted by the receiving side or a clock generated by a transmission clock signal generator (CLK) 18, in accordance with a mode switching signal 160, and it delivers the selected clock signal as the transmission clock signal 159. Besides these constituents, there is a DLC which connects the pairing transmission control units. Since, however, it is not directly pertinent to the present invention, a description thereof shall be omitted.

Figure 3:
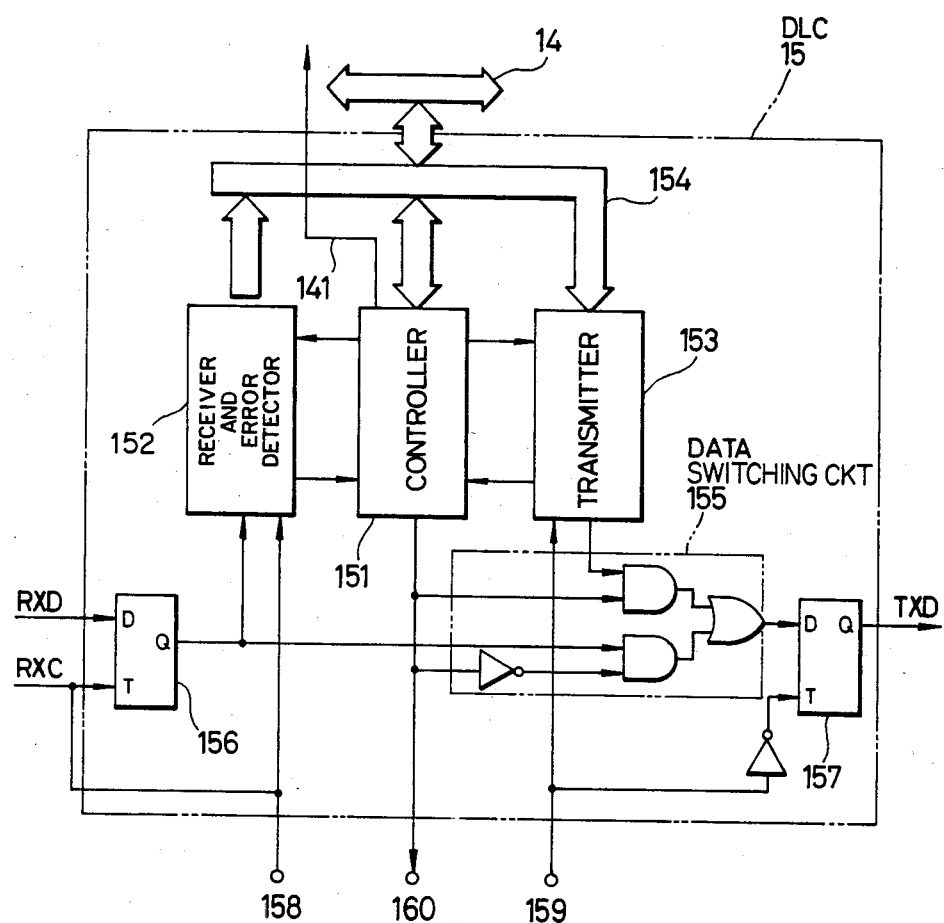
FIG. 3 is a block diagram of a data link circuit in FIG. 2.

FIG. 3 shows the internal arrangement of the DLC 15. An input flip-flop 156 receives the data RXD and clock signal RXC from the receiving interface portion 16 in FIG. 2, and reproduces the received data. A receiving portion 152 has a buffer register for reception and accepts the received data therein, and performs an error check, the result of which is conveyed to a control portion 151. When the control portion 151 has received a fixed amount of data (for example, 1 byte), it issues a reception interrupt request 141 to the MPU 11 and causes the RAM 13 to store the received data from an internal data bus 154 and via the bus 14. The control portion 151 also receives information on the presence of an error in the data from the receiving portion 152, and the MPU 11 examines it and takes a necessary measure. In response to the mode switching signal 160 from the control portion 151, a data switching portion 155 selects either the received data itself from the input flip-flop 156 or data transferred from the RAM 13 via the bus 14 as well as the internal data bus 154 to a transmitting portion 153, and it sends the selected data to an output flip-flop 157, from which the data is delivered to the transmitting interface portion 17 as the transmission data TXD. For example, 'MC 6854' which is a transmission LSI manufactured by Motorola, Inc. has such switching logic built therein and can therefore be used as the DLC 15.

Figure 4:
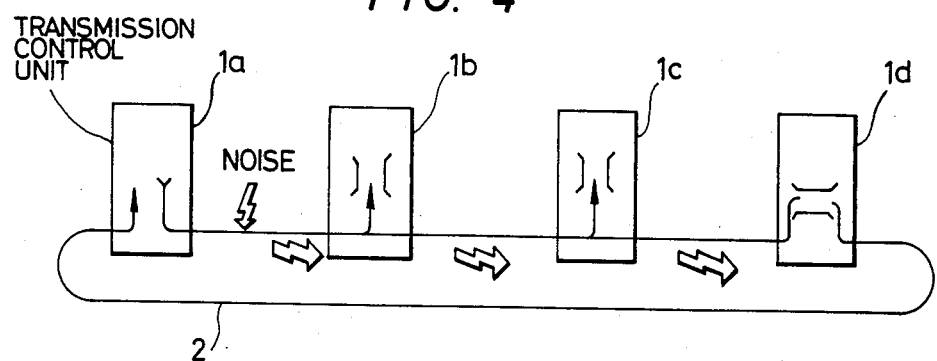
FIG. 4 is a model diagram showing the propagation of noise.

In the normal state of the transmission system, the received data from the input flip-flop 156 is delivered to the transmission line via the output flip-flop 157 as it is. This mode is called the "through mode." In this regard, when noise has developed at a certain point of the transmission line as illustrated in FIG. 4, data flowing therethrough is disturbed to become error data. On this occasion, when the transmission control units 1a and 1b are in the through mode, the error data is directly propagated, and the section in which the noise has developed cannot be discriminated. Moreover, when noise enters frequently, the MPU 11 expends an excess time on processing for the abnormal situations and cannot afford to execute other processing.

Figure 5:
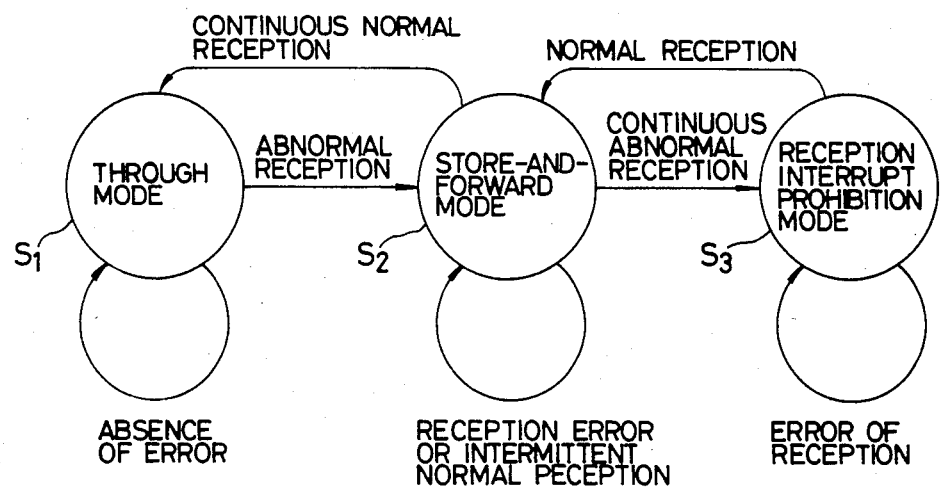
FIG. 5 is a state transition diagram showing the outline of a control process according to the present invention.

The present invention solves the above problem by switching modes in accordance with the circumstances of abnormal situations as illustrated in a state transition diagram of FIG. 5. Referring to FIG. 5, the transmission based on the through mode is carried out in the normal state S1. When an error has been detected in the reception data, the state changes into a state S2, in which the through mode is prohibited and is replaced with a mode (store-and-forward mode) of receiving the whole data frame and first storing it in the RAM 13 and thereafter forwarding it. After this mode has begun, the sending of the data as to which the error has been detected is inhibited, and hence, the propagation of the error data is prevented.

Besides, if a certain transmission control unit which is operating in this mode has detected an error in reception data again, the point of occurrence of the error lies in a section directly preceding the particular transmission control unit. Therefore, when the transmission control unit sends information expressive of its position (for example, the identification code of the particular transmission control unit), the subsystem (3 in FIG. 1) having picked it up can know the faulty position. Information expressive of the kind of the abnormality may well be sent together with the faulty position information.

Figure 6:
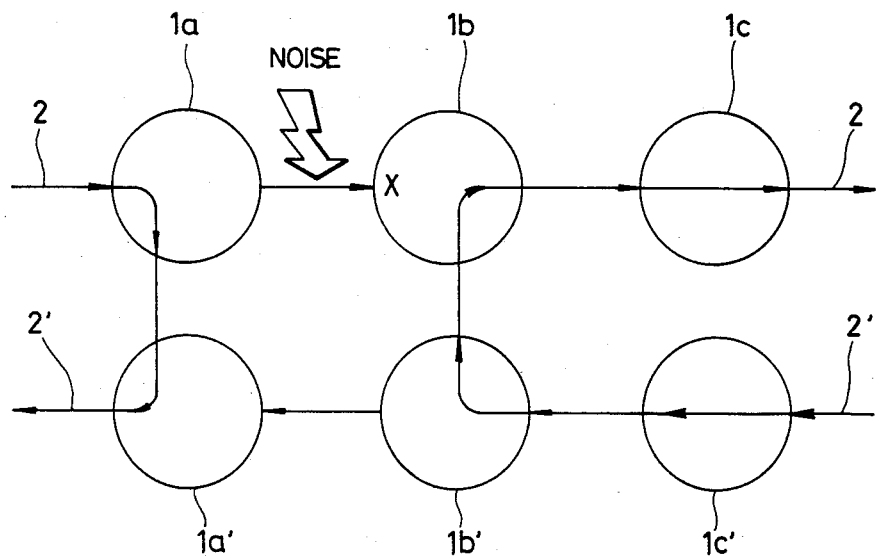
FIG. 6 is a model diagram showing the reconstruction of the transmission system.

If, during the operation in the store-and-forward mode, normal receptions have been continuously performed a predetermined number of times, the transmission system is regarded as having recovered from the fault and is reset to the state S1, in which the through mode operation is restarted. To the contrary, if abnormal receptions have continued a predetermined number of times, the probability of a lasting fault is high. At this time, the state changes into a state S3, in which the reception interrupt request 141 from the DLC 15 to the MPU 11 is prohibited. Accordingly, the storage and forwarding of the reception data are not performed. The aforementioned 'MC 6854' has such a function of prohibiting interrupt in accordance with information set in a built-in control register. Owing to this interrupt prohibition, the processing of the MPU 11 is prevented from being hampered by the abnormal interrupt. When this state has begun, the loops should preferably be reconstructed by forming transfer lines between the pairing transmission control units 1a and 1a' and those 1b and 1b' as illustrated in FIG. 6. Such reconstruction of the loops is described in Japanese Patent Application Publication No. 58-47111 mentioned before.

Under the state S3, although the MPU 11 is not informed of the reception on the basis of the interrupt, it examines the reception states of the DLC 15 periodically at suitable intervals. The DLC 15 has the reception register brought into an overflow state because the MPU 11 does not accept the received data, but it can execute an error check of the data frame. Accordingly, the MPU 11 can know whether or not the normal reception has occurred, upon examining the result of this error check. When a normal reception is detected, the DLC 15 returns to the state S2, in which the transmission based on the store-and-forward mode is carried out again.

Figure 7:
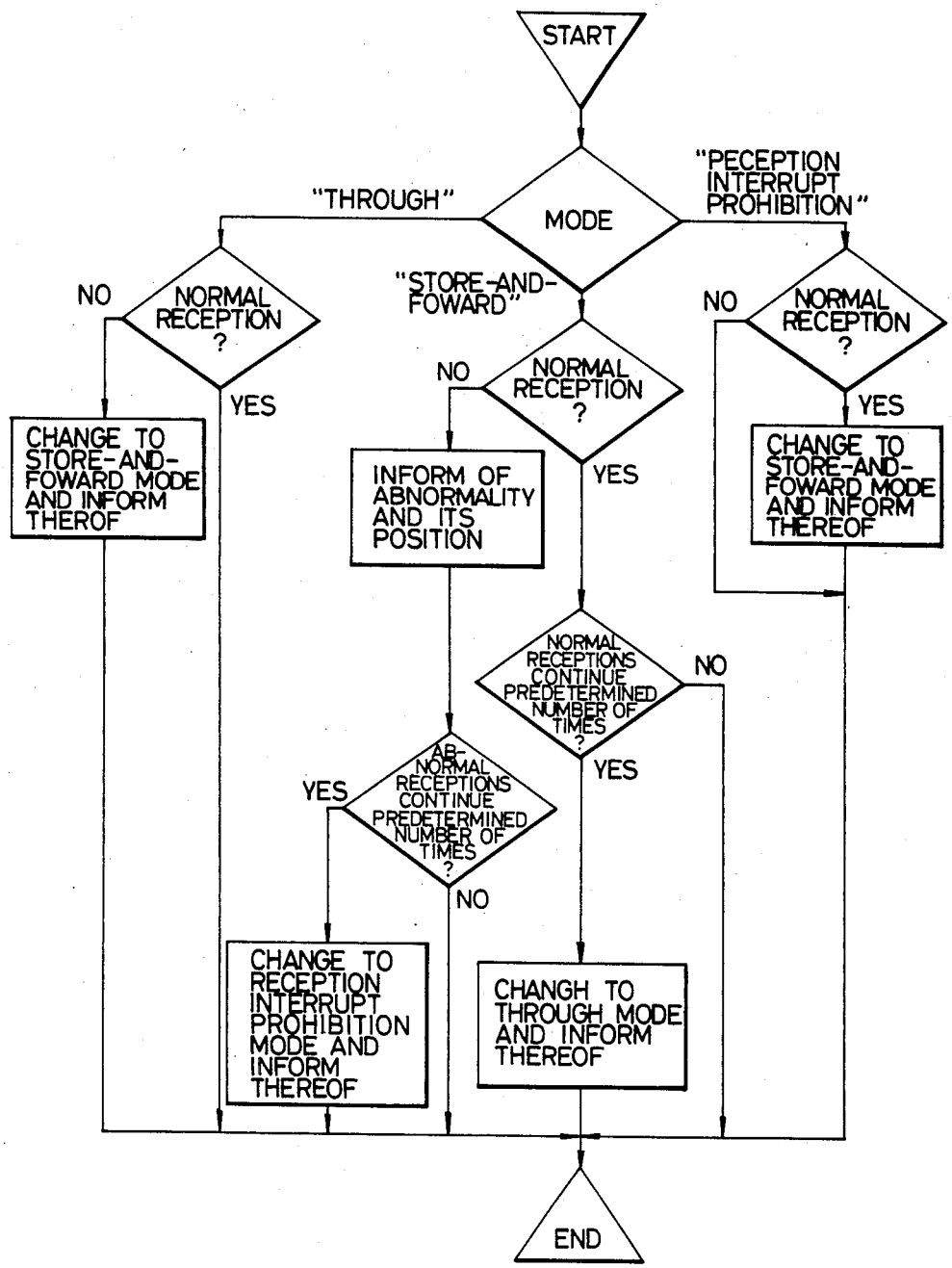
FIG. 7 is a flow chart of the control process according to the present invention.

FIG. 7 sums up the above control processes as a flow chart, which is carried out by MPU 11. When the states have changed, data expressing to that effect is delivered to the transmission line so as to report the change, whereby the other subsystems can know the abnormal situation of the transmission system and the recovery thereof. In this regard, the report of the state change between the through mode and the store-and-forward mode may well be omitted.

According to the present invention, not only a lasting fault such as a disconnection, but also a transient fault can have its influence prevented, and the position of the fault can be locally determined, with the result that the fault tolerance of a transmission system is enhanced and that the maintenance thereof is facilitated.

What is claimed is:

1. In a digital transmission system wherein a plurality of transmission control units are connected to each other in succession by a transmission medium each of said transmission control units having data receiving means for receiving data from said transmission medium, error detecting means for detecting error in received data, data storing means for storing received data, data transmission means for transmitting data to said transmission medium, and control means connected to said error detecting means for controlling data flow in the transmission control unit;

a control method for data transmission comprising the steps of:

operating a transmission control unit in a through mode in which received data is directly forwarded from said data receiving means to said data transmission means under a normal state of operation;

switching the operation mode of said transmission control unit to a store-and-forward mode in which a group of received data is first stored in said storing means and is thereafter forwarded to said data transmission means, in response to an error detection by said error detecting means in the operation in said through mode; and switching the operation mode of said transmission control unit to said through mode when said control means detects that normal data has been continuously received a predetermined number of times during operation in said store-and-forward mode.

2. A control method of data transmission according to claim 1, wherein at least one of said operation mode switching steps includes the step of forwarding information indicative of the change of modes through said transmission means.

3. In a digital transmission system wherein a plurality of transmission control units are connected in succession to each other by a transmission medium, each of said transmission control units having data receiving means for receiving data from said transmission medium, error detecting means for detecting error in the received data, data storing means for storing received data, data transmission means for transmitting data to said transmission medium, and control means connected to said error detecting means for controlling data flow in the transmission control unit;

a control method of data transmission comprising the steps of:

operating a transmission control unit in a through mode in which received data is directly forwarded from said data receiving means to said data transmission means under a normal state of operation;

switching the operation mode of said transmission control unit to a store-and-forward mode in which a group of received data is first stored and is thereafter forwarded to said data transmission means, in response to an error detection by said error detecting means during the through mode;

forwarding information indicative of an abnormal position if an error has been detected in received data again during the store-and-forward mode; and switching the operation mode of said transmission control unit to said through mode when said control means detects that normal data has been continuously received a predetermined number of times during said store-and-forward mode.

4. In a digital transmission system wherein a plurality of transmission control units are connected to each other in succession by a transmission medium, each of said transmission control units having data receiving means for receiving data from said transmission medium, error detecting means for detecting error in the received data, data storing means for storing received data, data transmission means for transmitting data to said transmission medium, and control means connected to said error detecting means for controlling data flow in the transmission control unit;

a control method for data transmission comprising the steps of:

operating a transmission control unit in a through mode in which received data is directly forwarded from said data receiving means to said data transmission means under a normal state of operation;

switching the operation mode of said transmission control unit to a store-and-forward mode in which a group of received data is first stored in said storing means and is thereafter forwarded to said data transmission means, in response to an error detection by said error detecting means under the through mode; and prohibiting said storing and forwarding operation of the received data when said control means detects that errors have been continuously detected by said error detecting means a predetermined number of times during said store-and-forward mode.

5. A control method of data transmission according to claim 4, wherein the step of prohibiting the storing and forwarding of the received data is continued until normal data is received by said data receiving means.

6. A control method for data transmission according to claim 5, wherein the step of the storing and forwarding of the received data includes the step of forwarding information through said transmission means indicating that said storing and forwarding operation has been prohibited.

* * * * *